United States Patent Office 3,516,976
Patented June 23, 1970

3,516,976
LOW TEMPERATURE ACRYLIC POLYMERIZATION
Arnold Hofer, Muttenz, and Ernst Lautenschlager, Basel, Switzerland, assignors to SCM Corp., Cleveland, Ohio, a corporation of New York
No Drawing. Filed May 11, 1966, Ser. No. 549,156
Claims priority, application Switzerland, May 14, 1965, 6,780/65
Int. Cl. C08f 3/64, 3/66, 3/68
U.S. Cl. 260—89.5      8 Claims

ABSTRACT OF THE DISCLOSURE

There is presented an improved redox system useful for polymerizing vinyl compounds and consisting essentially of a lipophilic organic vanadium compound and a mercaptan. Also shown is an improvement in process for polymerizing vinyl compounds which consists essentially of contacting a sirup thereof with said redox system. The process is particularly useful in the presence of molecular oxygen at modest operating temperature.

---

This invention relates to compositions which can be polymerized in air at low temperatures, and to a method of curing such compositions.

The compositions and the method are useful, for instance, for encapsulation of biological specimens under conditions where low temperatures are desired and where air canot be excluded. Other applications are in the fabrication of glass fiber laminates, as adhesives particularly suitable for acrylics, as raw material for the lacquer industry, for the manufacture of foams, for casting acrylic resin sheets, and for embedding electric circuit components.

In the polymerization of vinyl and particularly methylmethacrylic compounds, it is known to interrupt the reaction and to obtain thereby mixtures of sirupy viscosity which can be stabillized e.g. with hydroquinone and can be stored for a limited time. Such stabilized compositions can then be cured by addition of peroxidic polymerization catalysts.

It is also known that the polymerization of said prepolymers can be catalyzed, though with varying degrees of efficiency, by redox systems, e.g. methyl ethyl ketone peroxide and cobalt-II-naphthenate, or dibenzoyl peroxide and N,N-dimethyl-p-toluidine.

The use of such redox systems has various drawbacks. The fast strongly exothermic reaction produces elevated temperatures which are harmful in the encapsulation of heat sensitive objects. The pot life of the resin batches is short and they cannot be applied in relatively thick layers. In addition, air has an inhibiting effect so as to leave a rubbery to greasy surface. The uncured monomer molecules sweat subsequently out of the cured resin layers, thereby producing mechanical stresses.

It is a principal object of the present invention to provide an improved syrup which has not the recited drawbacks.

It is another object of the invention to provide a process to cure a composition which is polymerizable in air at low temperatures and which consists of monomers of vinyl compounds containing hetero atoms and/or aromatic carbon atoms, which composition contains 0 to 40, preferably 25 to 35 percent by weight of polmers, and mercaptans as stabilizing agents; as curing agent, we use a redox system free of peroxides, which consists of a lipophilic organic vanadium compound as oxidizing component and a mercaptan as reducing component.

The term "hetero" atoms is used herein in its conventional sense, meaning atoms other than carbon and hydrogen atoms. Suitable vinyl compounds are essentially acrylic esters, methacrylic esters, vinyl esters, also styrene and polymerizable derivatives thereof, such as α-methyl styrene and p-vinyl toluene; preferred compositions are mixtures of said monomers with each other. Also mixtures with 1 to 10 percent of suitable allyl monomers, such as diallyl phthalate or diethylene glycol diallyl dicarbonate, can be employed.

Suitable oxidizing components of the redox system are lipophilic organic vanadium compounds or mixtures of such compounds, preferably complex compounds of trivalent (III) or tetravalent (IV) vanadium with organic compounds subject to tautomeric reaction such as acetyl acetone, benzoyl acetone, aceto acetic or benzoyl acetic esters, also vanadium compounds of e.g. 5-chloro-8-hydroxyquinoline, 5,7-dibromo-8-hydroxyquinoline, di-2-ethylhexyl phosphoric acid, p-toluene sulfonic acid, and others.

It is assumed that thereby, with simultaneous oxidation of the mercaptan to the disulfide, the vanadium is reduced to a lower valence, whereby reoxidation can take place by the oxygen of the air.

As reducing component, we use mercaptans, particularly linear primary aliphatic mercaptans having at least 4, preferably 7–16 C. atoms, as e.g. n-heptanethiol-1, n-octanethiol-1, n-decanethiol-1, n-tetradecanethiol-1, particularly n-dodecanethiol-1 (lauryl mercaptan).

Both components of the curing system may be added simultaneously to the mass to be polymerized. However, it is also possible to add to the mass first the reducing component and then the oxidizing component. Said latter procedure is preferred when stabilization of the mass to be polymerized is desired.

The stabilizing properties of mercaptans, which have been known otherwise as chain transfer agents, are surprising. A polymerizable composition stabilized with primary lauryl mercaptan has an excellent much improved stability. After cooling, the resin has a shelf life of at least half a year at a temperature of 50° C. No yellowing of the lauryl mercaptan takes place.

In addition to their stabilizing properties, the recited mercaptans have the further advantage not to produce haze or discoloration.

Other mercaptans having good stabilizing properties are 2-mercaptobenzothiazol and particularly 2-mercaptothiazoline which, however, impart some discoloration or haziness to the resins.

It is a further advantage of the invention that the metal component does not become yellowish in the cured polymer. This improves considerably the weatherability of the cured resin.

The polymerization proceeds slowly within about 12 hours at room or slightly elevated temperatures (30° C.), and, in contrast to other procedures, is not inhibited by air. The polymerization of the mixture is conducted at a temperature of about 10° C. to 75° C. and for a time sufficient to polymerize at least 95% of the monomer in the polymerizable mixture. This allows of a number of commercial applications as e.g. embedding of heat sensitive objects in contact with air. It is surprising that air acts stabilizing in the stabilization of the polymerizable composition stabilized with primary lauryl mercaptan while it acts not as an inhibitor in the curing of the polymerizable composition according to the process of the invention.

The reducing component is preferably used in amounts of 0.1 to 0.5 mole percent, the oxidizing component in amounts of 1 to 400, preferably 10 to 50 mole p.p.m., calculated on the vinyl monomer. It is also surprising that such minimal amounts are sufficient to initiate and effect the curing of the polymer. In this way, the polymer retains its original purity, and the lack of any discoloration constitutes an advance over the prior art.

The following examples are given to illustrate the invention.

EXAMPLE 1

100 ml. of methylmethacrylate monomer-polymer mixture containing 25 percent by weight of polymer and 0.5 percent by weight of lauryl mercaptan were homogeneously mixed with 20 p.p.m. by weight of vanadium-III-acetyl acetonate dissolved in 0.4 cm.² of dimethyl phthalate. The batch was cast at room temperature into a mold whereby the ambient atmosphere had access to the surface of the resin. Curing took place for 12 hours at 20° C. The polymerization could be completed by subsequent tempering for 14 hours at 50° C.

If it is desired to obtain the polymer as foam, 1% by weight of azo-bis-(isobutyronitrile) is dissolved in the syrup, and it is first completely polymerized at room temperature. The foaming is produced by heating at 150° C. for 30 minutes. The density of the obtained foam is about 0.3 g./cm.³.

EXAMPLE 2

A monomer-polymer batch (30% by weight of polymer) was used which had been prepared from a monomer mixture consisting of 90% by weight of methylmethacrylate and 10% by weight of vinyl acetate, and containing 0.5 percent by weight of lauryl mercaptan. It was homogeneously mixed with 0.1 percent of a curing agent consisting of 0.5 g. of vanadyl-IV-acetylacetonate, 20 ml. of acetoacetic ester, and 100 ml. of dibutyl phthalate. The curing time was 12 hours at 20° C. Complete hardening required about additional 14 hours at 50° C.

If ten times the amount of curing agent was used and 3% of glycol dimethylacrylate was added as cross-linking agent, the compositions could be completely polymerized as a thin layer on a glass plate. The fact that the produced film was cross-linked and could be dissolved only partially in chloroform, was considered proof that true polymerization and not only evaporation of the monomer had taken place.

Similarly, the same composition can be used for the lamination of glass fiber webs.

EXAMPLE 3

A monomer-polymer mixture (28% by weight of polymer) was prepared by polymerizing a mixture of 50% by weight each of methylmethacrylate and n-butylmethacrylate in the presence of 0.5% by weight of lauryl mercaptan. As oxidizing agent, a solution of 0.3 g. of vanadyl (IV) acetylacetonate, 0.15 g. of vanadium-III-acetyl acetonate, and 0.005 of vandium-IV-benzoylacetonate dissolved in 20 ml. of acetacetic ester and 100 ml. of dibutylphthalate was used in an amount of 0.1 ml. per 100 ml. of the monomer-polymer mixture. The reaction time was 12 hours at 20° C. The polymerization could be completed by heating for about 14 hours at 50° C.

EXAMPLE 4

The monomer-polymer mixture (prepolymer containing about 32% by weight of polymer) was prepared as described in the preceding examples, using a monomer mixture consisting of 90 percent by weight of methylmethacrylate and 10 percent by weight of styrene. As oxidizing agent, we used a mixture of 0.5 g. of vanadyl-IV-acetylacetonate, 10 g. of benzoyl acetone, and 100 ml. dibutylphthalate, in an amount of 0.1 ml. per 100 ml. of prepolymer. The curing time was 24 hours at 20° C., whereby the polymerization could be completed by heating about 14 hours at 50° C. The prolonged curing time was due to the styrene content.

EXAMPLE 5

To 100 ml. of freshly distilled methylmethacrylate, there were added 0.5 ml. of pure lauryl mercaptan, and a mixture prepared from 0.5 g. of vanadium-III-benzoylacetonate, 20 ml. of benzoyl ester, and 100 ml. of dibutylphthalate was stirred into the mass in an amount of 0.1 ml.

After 5 hours at 40° C., the resin mixture had solidified to such an extent that small lead balls of about 2 mm. diameter did no longer sink down therein.

EXAMPLE 6

The procedure was as in Example 1 whereby a polymerizable composition containing about 35 percent by weight of polymer was prepared from 90 parts by weight of methylmethacrylate and 10 parts by weight of butyl acrylate. As oxidizing component, there were used 20 p.p.m. by weight of vanadium-III-benzoyl acetonate or the same amount of vanadium-III-benzoyl acetic ester, which could be dissolved, if desired, in a small amount of excess complexing agent or plastifier.

We claim:
1. In a process for forming a polymeric product from a mixture consisting essentially of from 60 to 100 percent by weight of at least one monomer and from 0–40% by weight of a polymer of an ester of acrylic or methacrylic acid, said monomer consisting essentially of from 90–100% by weight of an ester of acrylic or methacrylic acid and from 0–10% by weight of a vinyl compound, the improvement which comprises: polymerizing said mixture at a temperature of about 10° C. to 75° C. for a time sufficient to polymerize at least 95% of the monomer contained in said mixture and polymerizing in the presence of a redox catalyst system consisting essentially of:
   (A) from 1–400 parts per million of a trivalent or tetravalent organic vanadium compound of a $\beta$-diketone, of an acyl acetic ester, of a halogenated hydroxyquinoline, of an alkyl or aryl substituted phosphoric or sulfonic acid, said parts of organic vanadium compound calculated on the weight basis of said monomer, and
   (B) from 0.1 to 0.5 mol percent of a mercaptan basis weight of said monomer, said mercaptan being a linear aliphatic primary mercaptan, 2-mercaptobenzothiozole or 2-mercaptothiozoline.

2. The process of claim 1 wherein said monomer in said mixture is methyl methacrylate.

3. The process of claim 1 wherein said monomer in said mixture is a glycol methacrylate.

4. The process of claim 1 wherein said vinyl compound is vinyl acetate.

5. The process as claimed in claim 1 wherein said organic vanadium compound is vanadium-III-benzoyl acetonate.

6. The process as claimed in claim 1 wherein said organic vanadium compound is vanadium-III-acetyl acetonate.

7. The process as claimed in claim 1 wherein said organic vanadium compound is vanadyl-IV-acetyl acetonate.

8. The process as claimed in claim 1 comprising adding to said composition first said reduction and then said oxidation component.

References Cited

UNITED STATES PATENTS 3,274,169  9/1966  Lindblom.
3,380,980  4/1968  Calkins et al.

HARRY WONG, JR., Primary Examiner

U.S. Cl. X.R.

260—86.1, 88.5, 86.7, 78.5, 90.81.